Aug. 2, 1960 — H. F. VON WIMMERSPERG — 2,947,353
SAFETY BELT DEVICE
Filed May 24, 1956 — 4 Sheets-Sheet 1
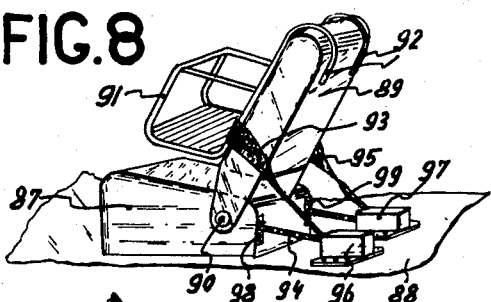
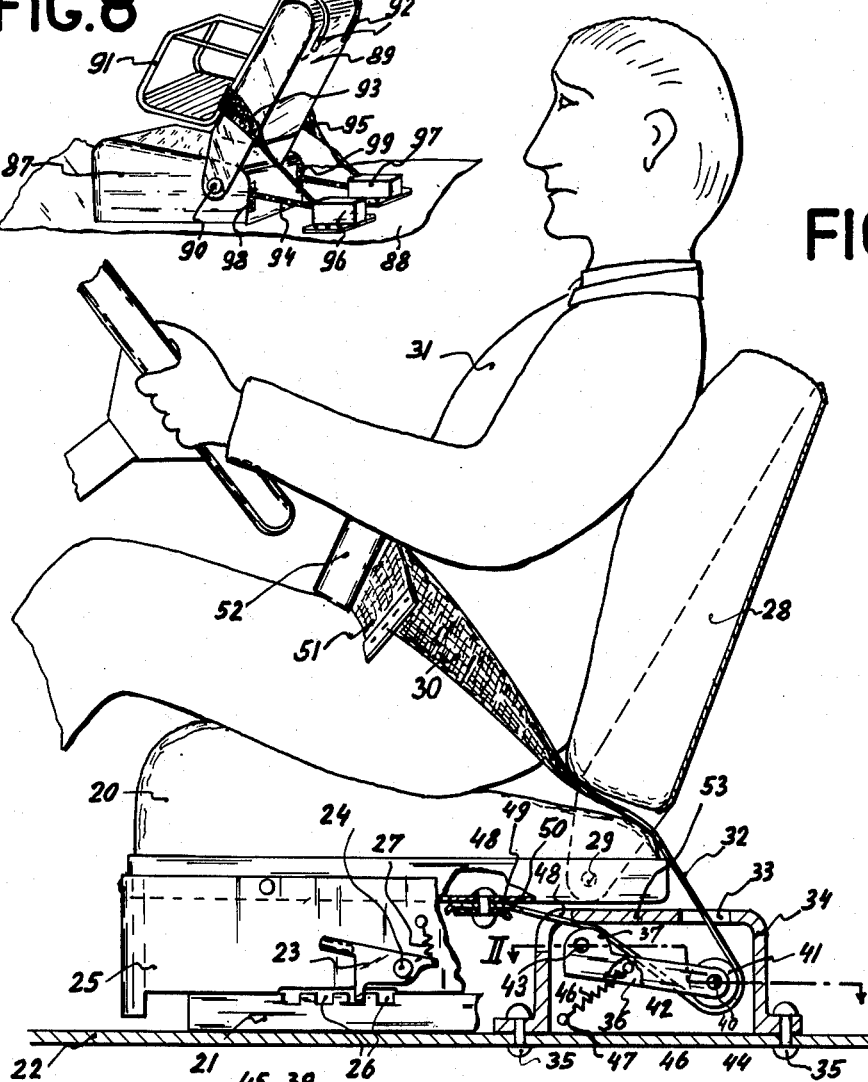
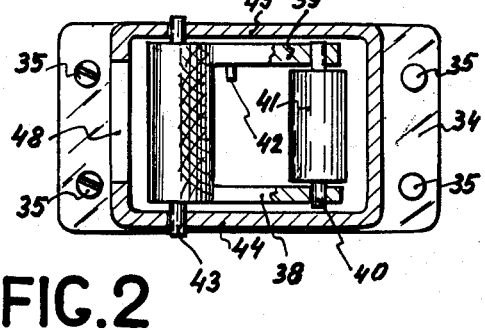
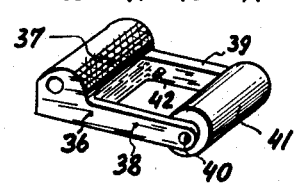
INVENTOR.
Heinrich F. von Wimmersperg
BY Aug. 2, 1960  H. F. VON WIMMERSPERG  2,947,353
SAFETY BELT DEVICE
Filed May 24, 1956  4 Sheets-Sheet 2
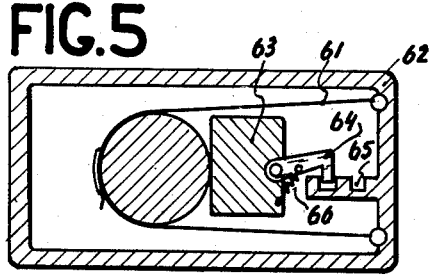
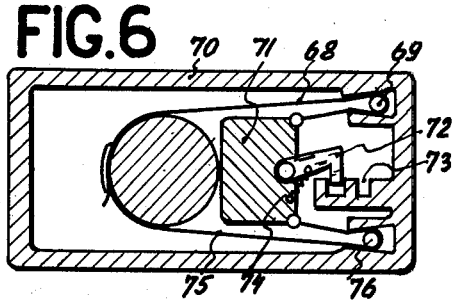
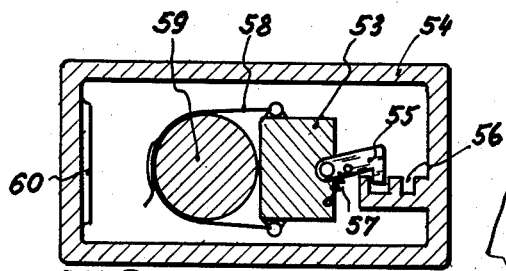
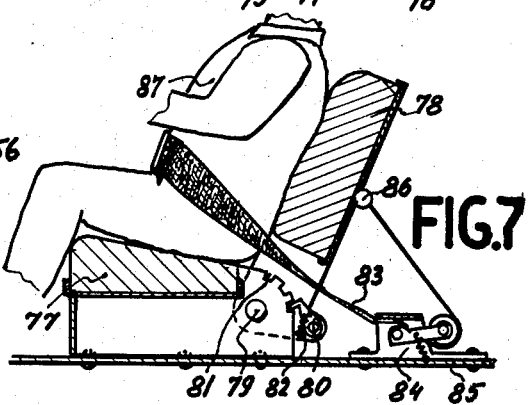
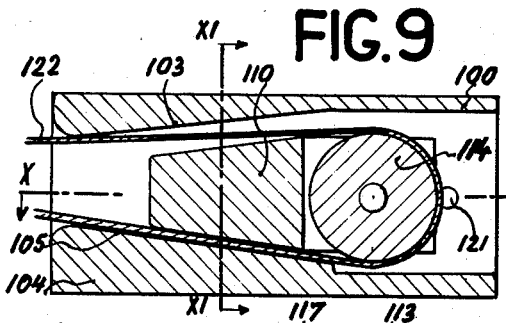
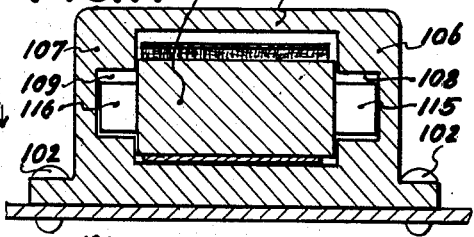
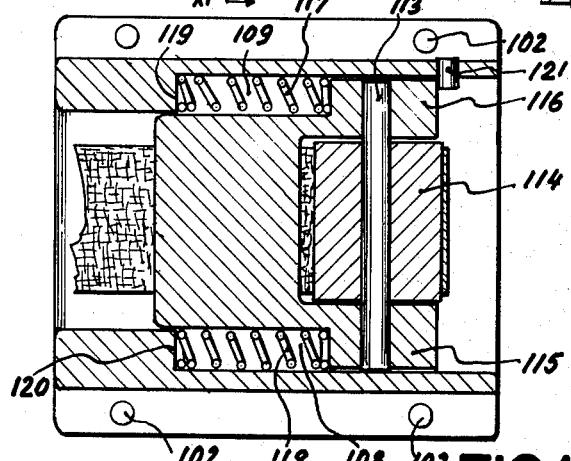
INVENTOR.
Heinrich F. von Wimmersperg
BY

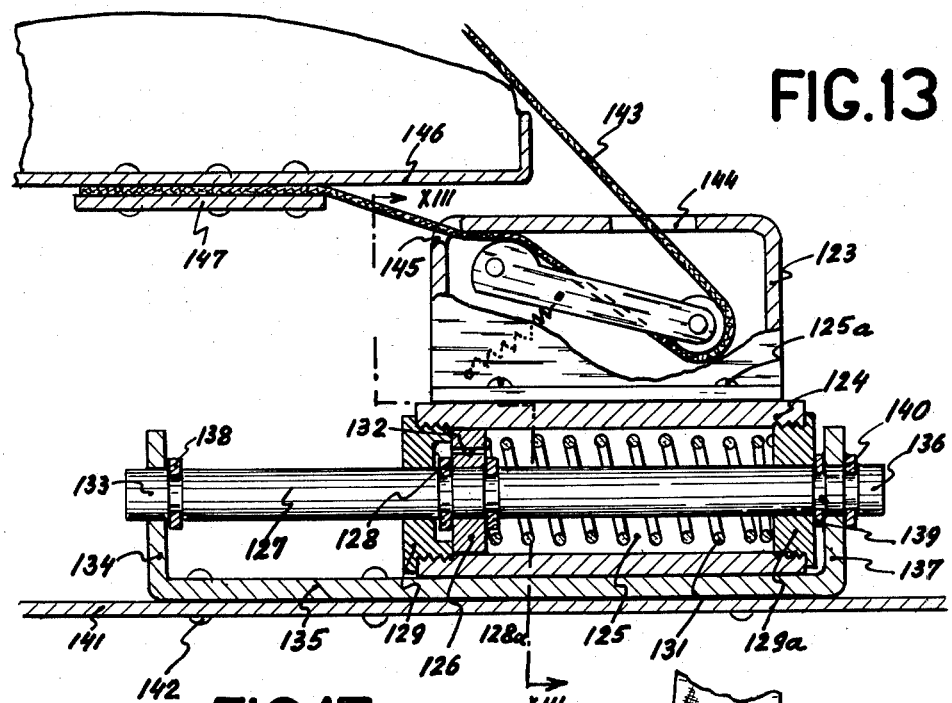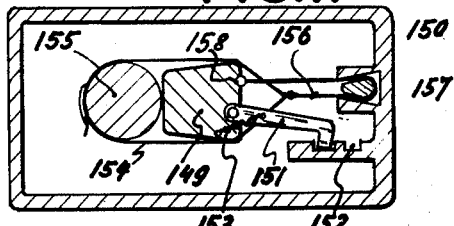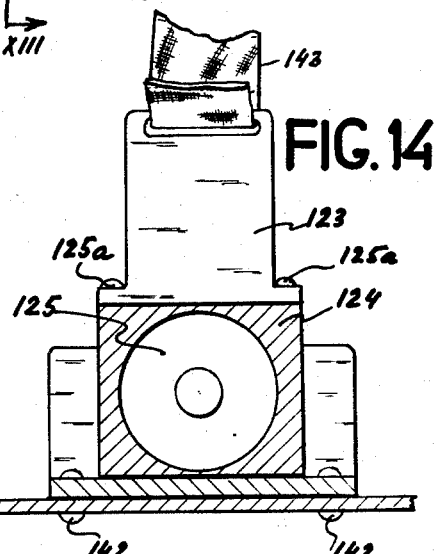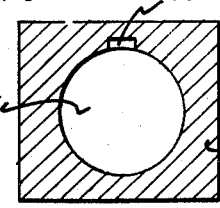

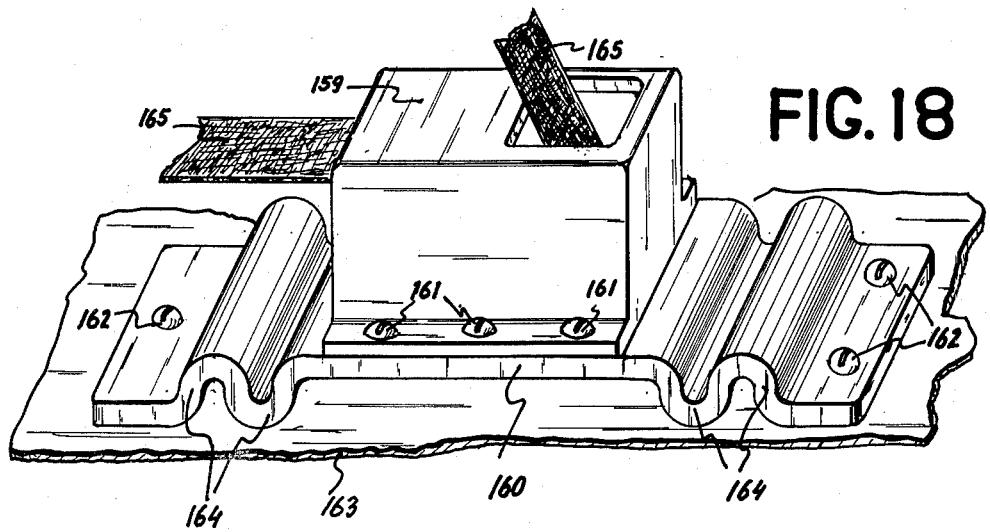

United States Patent Office 2,947,353
Patented Aug. 2, 1960

2,947,353

SAFETY BELT DEVICE

Heinrich Ferdinand von Wimmersperg,
15721 Rosemont Road, Detroit 23, Mich.

Filed May 24, 1956, Ser. No. 587,074

23 Claims. (Cl. 155—189)

This invention relates to safety belts for cars, airplanes or other vehicles with shiftable seats, which can be adjusted to the size of the passenger or driver, or with seats with adjustable backs.

The variations in the size of the human body make it necessary to adjust the position of the driver's seat in a car in regard to the controls to be operated by foot and hand. This is mostly achieved by shifting the seat to the desired position and then locking it by detachable means like pawls engaging notches. These locking devices are not able to withstand heavy sudden loads like the deceleration forces in head-on collisions. In the following description the term "passenger" is used for driver and passenger as well.

With a sudden deceleration the passenger is thrown forward toward the windshield or dashboard. It is very difficult to avoid a serious injury in the resulting crash. This gets even worse if the seat jumps the locking device and breaks loose from its guideway and strikes the driver or passenger just at the moment when he hits the windshield or dash board. The part of the body hitting the car has to absorb not only its own kinetic energy but the energy of the seat as well. The bones are very often crushed to pulp in an impact of this type.

The introduction of safety belts, customary in airplanes, did not provide the desired solution. If the belt is fastened to the seat, the passenger and seat move forward together if the seat breaks loose, and the body has to absorb its own and the seat's energy as well. If the belt is fastened to the car frame, and the seat breaks loose, then both the energy of the passenger and of the seat are to be absorbed by the belt and the body of the passenger gets squeezed by both kinetic energies. The sudden squeeze of the internal organs builds up high pressure with resulting acceleration of the fluids in the organs, causing ruptures.

The reclining backs of seats in airplanes disengage the locking device and the passenger has to absorb the energy of the seat back as well, causing serious injuries. The basket type of seat for children, fastened on the top of the back of the seat in a car, presents the same problem, if the back is hinged to the seat. The sudden deceleration forces of a collision cause the seat back to swing forward and the head of the child might be smashed against the dash board. If the seat breaks loose also, the situation is hopeless.

The main object of this invention is to provide a safety belt which secures passenger and car seat as well to the car frame, thus preventing a dangerous forward movement of the passenger and of the seat as well, even if the seat breaks loose from its guideway in a sudden deceleration.

A further object of the invention is to provide a safety belt which adjusts itself automatically to the size of the passenger and to the position of the seat as well by tightening the belt.

Another object of the invention is to provide a safety belt which secures the back of the seat and the passenger as well independently to the frame of the vehicle, thus absorbing the kinetic energy of the seat back and passenger independently in the case that the back locking device fails under the deceleration forces.

A further object of the invention is to provide a safety belt which adjusts itself automatically to the size of the passenger and to the position of the seat back as well by tightening the belt.

Another object is to provide a safety belt which absorbs the deceleration forces to which a child sitting in a basket seat attached to the car seat is submitted, and those of the seat back as well.

The novel features that I consider characteristic of my invention are set forth with particularity in the appended claims. Further objects of the invention and novel features of the construction will be apparent when considered together with the accompanying drawings, in which Fig. 1 is a side view of vehicle seat with an embodiment of the invention, partly in longitudinal section, Fig. 2 is a section along the lines II—II of Fig. 1 of the clamping device, Fig. 3 shows the clamp of the clamping device in perspective, Fig. 4 shows diagrammatically a safety belt fastened to the adjustable seat of a car.

Fig. 5 shows diagrammatically a safety belt fastened to the car frame,

Fig. 6 shows diagrammatically a safety belt according to the invention securing passenger and seat to the car frame, Fig. 7 shows a safety belt according to the invention securing passenger and back of seat to the frame of the vehicle, Fig. 8 shows a safety belt securing a basket for a child hanging on the back of the seat and the back of the seat and the seat to the frame of the car, Figs. 9–12 show another embodiment of the clamping device according to the invention, in which Fig. 9 shows a longitudinal section, Fig. 10 shows a section along the lines X—X of Fig. 9, Fig. 11 is a section along the lines XI—XI of Fig. 9, Fig. 12 is the friction wedge in perspective, Fig. 13 is another embodiment of the invention in longitudinal section Fig. 14 is a section along the lines XIV—XIV of Fig. 13, Fig. 15 is a longitudinal section of the break housing of Fig. 13, Fig. 16 is a cross section along the lines XVI—XVI of Fig. 15, Fig. 17 shows diagrammatically a safety belt according to the invention securing the passenger and the seat to the frame of a car having only one clamping device, and Fig. 18 shows a breaking device in perspective.

In Fig. 1 the seat 20 of a car, shiftably mounted on guideway 21, which is rigidly fastened to the car frame 22, is locked in position by pawl 23, rotatably mounted at 24 to the bottom 25 of the seat and forced into one of the notches 26 by spring 27. The notches are formed in guideway 21. The back 28 of the seat 20 is hinged to the seat at 29. The safety belt 30 is wrapped around the front of the passenger 31 and both ends go backward through the space between seat 20 and seat back 28. The left end 32 (seen in the direction of the travel) is shown in Fig. 1. It enters the opening 33 of the clamp housing 34. This clamp housing 34 is rigidly fastened to the car frame 22 by rivet 35. The clamp 36 consists of the curved clamping part 37 and the two arms 38, 39, which accommodate the axle 40 of the roller 41. The pin 42 is rigidly secured to the arm 39. The clamp 36 swings around axle 43, which is mounted in the side walls 44, 45 of the housing 34. One end of the extension spring 46 is mounted on pin 42, the other end on pin 47 of the side wall. The spring 46 forces the clamp in the clockwise direction. The end 32 of the safety belt extends around roller 41, over the clamping surface 37 and leaves the clamp housing 34 at the opening 48. It is attached to the bracket 49, which is rigidly fastened to the bottom of the plate (bottom) 50 of the seat bottom 25. The other end 51 of the safety belt is guided through the space between the seat and the seat back also and enters and leaves a clamping device similar to the clamping device described above. As both are identical, only one clamping device is described.

It is assumed that the two ends of the safety belt are joined by the buckle 52, and that the passenger has pulled the ends tightly, as shown in Fig. 1. Therefore the end 32 turns the clamp 36 counterclockwise against the spring 46 until the surface 37 presses the belt firmly against the top 53 of the clamp housing 34. The curved surface 37 works like a circular wedge, increasing the pressure on the belt with counterclockwise rotation, until the clamp is in the position shown in Fig. 1. The part of the belt between clamping surface 37 and bracket 49 is pulled tight during the tightening of the belt, because the spring 46 keps the clamp in the released position until the pull of the belt forces the clamp counterclockwise.

If the car decelerates suddenly the body of the passenger is held by the safety belt, as the clamping device secures it to the car frame. The stronger the pull of the body, the bigger the friction in the clamp, which holds the belt. If the deceleration was so sudden that the kinetic energy of the seat unit shears off the pawl and the seat tries to move forward, it is held back by the safety belt. Thus both passenger and seat as well are kept in their position. The passenger has to absorb his own kinetic energy only on the safety belt.

The driver or passenger can adjust the position of the seat in a forward direction freely without interference by the clamping device, if the buckle of the belt is open, because the clamping device is then in the released position. The seat can be shoved backwards even if the buckle is closed, but the belt has to be tightened afterwards. By tightening the belt after closing the buckle the belt adjusts itself automatically to any position of the seat and to any size of the passenger. As soon as deceleration forces develop, the clamp is in operation automatically.

Fig. 4 shows diagrammatically a safetly belt as conventionally attached to the car seat. The seat 53 is shiftably mounted on car frame 54 and is locked into position by a pawl 55 engaging one of the notches 56, spring 57 forces the pawl into the notch. The safety belt 58 is fastened to the seat 53. If the car decelerates suddenly and the kinetic energy of the seat overcomes the strength of the locking device, the seat and passenger 59 move forward. The passenger's head might go through the windshield. The passenger has to absorb a part of the energy of the seat and his own energy. In Fig. 5 the belt 61 is fastened in a conventional manner to the frame 62. The seat is shiftably mounted on the car frame 62 and held in place by the pawl 64, which is forced into one of the notches 65 by spring 66. If the seat breaks loose in an accident, it moves forward and squeezes the passengers body 67 against the safety belt 61. The energy of both the seat and of the passenger have to be absorbed by the internal organs of the passenger.

Fig. 6 shows diagrammatically a safety belt of which end 68 is secured by a clamping device 69 to the car frame 70 and the seat 71. The seat 71 is shiftably mounted on car frame 70 and locked to it by pawl 72, which is forced into one of the notches 73 by spring 74. The end 75 of the safety belt is secured by clamping device 76 to the car frame 70 and to the seat 71. If the car frame decelerates and the seat breaks loose, it cannot move forward as the safety belt holds it back. The passenger's body has to absorb its own energy only.

Fig. 7 shows diagrammatically a seat 77 with an adjustable back 78 hinged to it at 79 and locked into position by pawl 80 forced into one of the notches 81 by spring 82. The safety belt end 83 coacts with the clamping device 84, rigidly fastened to car frame 85 and is fastened to the seat back at 86. Another similar clamping device, also secured to the car frame coacts with the other end of the safety belt, which is also fastened to the seat back. In securing the seat belt, the passenger passes it from fastening 86 through clamping device 84 and takes up any slack in the belt. The clamping device 84 is constructed and operates in generally the same manner as clamping device 34, 36 of Fig. 1. A sudden hard pull on either end of the belt causes the belt to be securely clamped by device 84. If the seat back breaks loose under the forces of deceleration the belt holds both passenger 87 and seat back 78. The passenger has to absorb his own energy only on the safety belt. Another use is shown diagrammatically in Fig. 8. The car seat 87 is shiftably mounted on car frame 88 and locked into position by a pawl as described above, but not shown. The back is hinged to the seat at 90. The basket 91 to accommodate a child, not shown, is hung on the top of the back 89 by hooks 92 as known to art. The safety belt 93 holds the basket in contact with the seat back 89 and the ends of the safety belt 94, 95 coact as dscerided above with clamping devices 96, 97, secured to the car frame 88, and are fastened to the seat 87 at 98, 99. If the car decelerates suddenly, the back 89 starts to swing forward and the seat may break loose, but both movements are stopped by the safety belt. The child has to absorb his own energy only on the basket.

Figs. 9–12 show another embodiment of the clamping device. The housing 100 is rigidly fastened to the frame 101 by screws 102. Its top wall is inclined at 103 and the bottom 104 at 105. The side walls 106, 107 have longitudinal channels 108, 109. The wedge 110 has two arms 111, 112 to hold the axle 113 for the roller 114 and forming the spring rests 115, 116. The compression springs 117, 118, are located in the channels 108, 109. One of their ends rests against wall 119, 120, the other against the spring rests 115, 116 of the wedge 110, pressing the wedge into the release position against stop 121. The safety belt 122 enters the housing 100 from the left, goes over the roller and leaves at the left again. The springs 117, 118 press the wedge to the right, so that the wedge does not prevent the belt from moving freely. As soon as both ends are pulled, or one end is pulled and the other is secured, the wedge moves to the left and the pressure between wedge and belt and housing builds up until the friction prevents a further movement of the belt. The clamp releases the belt again as soon as the pull of the passenger is decreased sufficiently. The springs 117, 118 shift the clamp into the inoperative position to the right. Thus this clamp works the same way as the clamp device of the first embodiment and is used in the same way.

In Figs. 13–16 a further improvement is shown. The clamping device housing 123 is not fastened rigidly to the frame but to hydraulic brake housing 124 by screws 125a. The housing 124 has a cylindrical bore 125 which coacts in the way known in the art with the piston disc 126, non-shiftably mounted on rod 127 by spring rings 128, 128a. The rod 127 protrudes through a cylindrical bore of the head screw 129 and through a cylindrical bore of the bottom screw 129a. Head screw 129 and bottom screw 129a are tightly screwed into housing 124. One end of the strong compression spring 131 rests on the piston disc 126, the other end on the bottom screw 129a. The cylindrical bore 125 is filled with a fluid. The hole 132 in disk 126 connects the fluid in front and back of disk 126. The front end 133 of the rod 127 rests in the front end 134 of the mount 135, the back end 136 in the back wall 137 of the mount. Spring rings 138, 139 and 140 prevent a longitudinal displacement of the rod 127. The mount 135 is rigidly secured to the car frame 141 by rivets 142. The safety belt 143 enters the clamping device at 144 and leaves it at 145. It is fastened to the bottom of the seat 146 by bracket 147, riveted to the bottom 146. The safety belt and the clamping device correspond exactly to the first embodiment. The only difference is that the clamping device is not fastened directly to the car frame, but instead rigidly fastened to the hydraulic brake, which is secured to the car frame.

If the car decelerates suddenly, the passenger is held back by the safety belt 143, which tightens the clamping device. The safety belt pulls the clamping device to the left, compresses the compression spring 131 and accelerates the fluid in the cylindrical bore by forcing it through the small orifice 132 of the piston. This acceleration of the fluid consumes energy and slows down the movement of the passenger gradually, thereby reducing the maximum pressure between passenger body and safety belt. Therefore the pressure on the internal organs of the passenger is reduced as well. The danger of injuries is much smaller. The maximum strains of all mechanical parts is reduced also. If the seat breaks loose it moves with the same speed as the passenger until both stop.

It is clear that other types of brakes can be used to slow down the speed of the clamping device gradually. Friction brakes or connecting parts, deforming under the pull could be used also. But the hydraulic brake has a great advantage over all other forms of brakes because it is possible to keep the braking force constant over the whole displacement of the moving part, thereby keeping the braking force to a minimum. This can be done by using a channel of variable sectional area for the fluid instead of the hole 132. Figs. 15 and 16 show the housing 124 having a groove 148 of varying section area over the length of the displacement.

A constant braking force value is obtained, if the area of the groove section is computed according to the formula $$f = \sqrt{\frac{F^3 g}{G_o}} \sqrt{r-x}$$

wherein $f$ = area of groove in dm.$^2$
$F$ = area of cylinder section in dm.$^2$
$g$ = specific weight of fluid in kg/dm.$^3$
$c$ = reduction factor, usually 0.60 to 0.65
$r$ = maximum displacement in dm.
$x$ = displacement in dm.
$G$ = weight of passenger plus seat, to be absorbed, in kg.

In this formula, which is derived from formulas used to design hydraulic brakes for heavy firearms, the maximum initial velocity of the masses to be slowed down is not included. The hydraulic brake keeps the braking power constant over the displacement but this braking power is of course different for different initial velocities. Thus a minimum braking power is obtained automatically.

It is of course possible to have the brake housing rigidly fastened to the car frame and the piston secured to the clamping device without changing the scope of the invention. It will be appreciated that other equivalent means may be used for connecting the clamping device and the car frame. The hydraulic brake illustrated and described gives the most satisfactory results. The use of a resilient brake or springs is not recommended, because they pull the passenger back again at a time when his head is still moving forward by its inertia. The sudden change of direction involved endangers the brain.

It is possible to use one clamping device only for the safety belt to reduce the cost. Fig. 17 shows diagrammatically the arrangement. The seat 149 is shiftably mounted on the structure 150 of the vehicle and is locked into position by pawl 151 forced into one of the notches 152 by spring 153. The safety belt consists of the part 154, extending around the passenger 155 and the part 156, which is clamped to the structure of the vehicle by clamp 157 and rigidly fastened to the seat unit at 158. The function of this set-up is identical with the function of the embodiments described above.

Another embodiment of the breaking device is shown in Fig. 18. The clamping device 159 is rigidly fastened to mounting plate 160 by screws 161. The mounting plate 160 is rigidly fastened to the vehicle structure 163 by screws 162. In case of a crash, the corrugations 164 of the mounting plate deform permanently under the pull of the safety belt 165 and reduce the maximum forces of the impact. After the crash a new mounting plate has to be installed.

Although I have described my invention with a certain degree of particularity, it is understood that the present disclosure has been only by way of example and that numerous changes in the details of construction and the combination and arrangement of parts may be resorted to without departing from the spirit and the scope of the invention as hereinafter claimed.

I claim:

1. In combination, a vehicle structure, a seat mounted on the vehicle structure, a clamping device, means rigidly and immovably mounting said clamping device on the vehicle structure adjacent but free of the seat, a seat belt having one end fixedly anchored to the seat at a point spaced from the clamping device, said belt extending from said anchoring point on said seat at said one end through said clamping device and from said clamping device in a direction forwardly and upwardly of the seat, the other end of said belt being arranged for securing a passenger in the seat, said clamping device being engageable with an intermediate portion of the belt with substantially non-yielding clamping pressure to resist movement of the belt relative to the clamping device whereby to anchor both the seat and the passenger on the seat to said vehicle structure.

2. In combination, a vehicle structure, a seat mounted on the vehicle structure, a clamping device secured to the vehicle structure adjacent the seat, a seat belt having one end connected to the seat, said belt extending from said seat at said one end through said clamping device and from said clamping device in a direction forwardly and upwardly of the seat, the other end of said belt being arranged for securing a passenger in the seat, said clamping device being engageable with an intermediate portion of the belt with substantially non-yielding clamping pressure to resist movement of the belt relative to the clamping device whereby to anchor both the seat and the passenger on the seat to said vehicle structure, said one end of the belt being anchored to the seat at a point spaced forwardly from said clamping device.

3. In combination, a vehicle structure, a seat mounted on the vehicle structure, a clamping device secured to the vehicle structure adjacent the seat, a seat belt having one end connected to the seat, said belt extending from said seat at said one end through said clamping device and from said clamping device in a direction forwardly and upwardly of the seat, the other end of said belt being arranged for securing a passenger in the seat, said clamping device being engageable with an intermediate portion of the belt with substantially non-yielding clamping pressure to resist movement of the belt relative to the clamping device whereby to anchor both the seat and the passenger on the seat to said vehicle structure, said clamping device including a first member secured to the vehicle structure and a second member movably mounted on the first member, said members being formed with clamping surfaces between which said belt extends, said movable member being movable on said first member in response to tensioning of said belt to securely clamp said belt between said clamping surfaces.

4. In combination, a vehicle structure, a seat mounted on the vehicle structure, a clamping device secured to the vehicle structure adjacent the seat, a seat belt having one end connected to the seat, said belt extending from said seat at said one end through said clamping device and from said clamping device in a direction forwardly and upwardly of the seat, the other end of said belt being arranged for securing a passenger in the seat, said clamping device engaging an intermediate portion of the belt with clamping pressure to resist movement of the belt relative to the clamping device whereby to anchor both the seat and the passenger on the seat to said vehicle structure, said clamping device including a first member secured to the vehicle structure and a second member movably mounted on the first member, said members being formed with clamping surfaces between which said belt extends, said movable member being movable on said first member in response to tensioning of said belt to securely clamp said belt between said clamping surfaces, and means yieldably biasing said movable member in a direction to separate said clamping surfaces.

5. In combination, a vehicle structure, a seat mounted on the vehicle structure, a clamping device secured to the vehicle structure adjacent the seat, a seat belt having one end connected to the seat, said belt extending from said seat at said one end through said clamping device and from said clamping device in a direction forwardly and upwardly of the seat, the other end of said belt being arranged for securing a passenger in the seat, said clamping device engaging an intermediate portion of the belt with clamping pressure to resist movement of the belt relative to the clamping device whereby to anchor both the seat and the passenger on the seat to said vehicle structure, said clamping device including a first member secured to the vehicle structure and a second member movably mounted on the first member, said members being formed with clamping surfaces between which said belt extends, said movable member being movable on said first member in response to tensioning of said belt to securely clamp said belt between said clamping surfaces, said movable member comprising a rotatably supported wedge member, said wedge member being rotatable in response to a pull on said belt to wedge the belt against the clamping surface of the other member.

6. In combination, a vehicle structure, a seat mounted on the vehicle structure, a clamping device secured to the vehicle structure adjacent the seat, a seat belt having one end connected to the seat, said belt extending from said seat at said one end through said clamping device and from said clamping device in a direction forwardly and upwardly of the seat, the other end of said belt being arranged for securing a passenger in the seat, said clamping device engaging an intermediate portion of the belt with clamping pressure to resist movement of the belt relative to the clamping device whereby to anchor both the seat and the passenger on the seat to said vehicle structure, said clamping device including a first member secured to the vehicle structure and a second member movably mounted on the first member, said members being formed with clamping surfaces between which said belt extends, said movable member being movable on said first member in response to tensioning of said belt to securely clamp said belt between said clamping surfaces, said movable member being rotatably supported on said first member, said rotatable member being fashioned with a wedge portion which, when said member is rotated in one direction, clamps said safety belt against the clamping surface of the first mentioned member, said rotatable member also being provided with a second portion around which said safety belt extends, said second portion being spaced from the pivotal axis of said rotatable member and providing a lever for pivoting said rotatable member in said one direction in response to tensioning of said belt.

7. The combination called for in claim 6 wherein said first member comprises a housing in which said second member is pivotally mounted.

8. In combination, a vehicle structure, a seat mounted on the vehicle structure, a clamping device secured to said vehicle structure, a seat belt having one end connected to the seat and having its opposite end arranged for securing a passenger in the seat, said belt extending from said seat at said one end through said clamping device and from said clamping device in a direction forwardly and upwardly of the seat, said clamping device including a pair of wedge members, one of which is secured to the vehicle structure and the other of which is movably mounted on the wedge member secured to the vehicle structure, said belt extending between said wedge members and engaging said movable wedge member such that tensioning of said belt moves said movable wedge member into wedging relation with the other wedge member to thereby non-yieldably clamp the belt therebetween.

9. In combination, a vehicle structure, a seat mounted on the vehicle structure, a clamping device secured to said vehicle structure, a seat belt having one end connected to the seat and having its opposite end arranged for securing a passenger in the seat, said belt extending from said seat at said one end through said clamping device and from said clamping device in a direction forwardly and upwardly of the seat, said clamping device including a pair of wedge members, one of which is secured to the vehicle structure and the other of which is movably mounted on the wedge member secured to the vehicle structure, said belt extending between said wedge members and engaging said movable wedge member such that tensioning of said belt moves said movable wedge member into wedging relation with the other wedge member to thereby clamp the belt therebetween, and a yieldable connection between said clamping device and said vehicle structure, said yieldable connection permitting movement of said clamping device in a forwardly direction in response to sudden deceleration of the vehicle to thereby absorb a portion of the kinetic energy of the passenger secured by said seat belt.

10. The combination called for in claim 9 wherein said yieldable connection comprises a hydraulic brake comprising two members, one of which is secured to said clamping device and the other secured to said vehicle structure.

11. The combination called for in claim 9 wherein said yieldable connection comprises a piston-cylinder assembly which includes a cylinder member and a piston member movable in said cylinder member, one of said last mentioned members being connected to the clamping device and the other being connected to the vehicle structure, said cylinder member being filled with hydraulic fluid and means forming a restricted bypass from one side of the piston member to the other side of the piston member within said cylinder whereby upon sudden deceleration of said vehicle, the piston moves in said cylinder at a rate controlled by the flow of hydraulic fluid through said restricted bypass.

12. The combination called for in claim 11 wherein said restricted bypass comprises an aperture extending through said piston.

13. The combination called for in claim 11 wherein said restricted bypass comprises a groove extending longitudinally along the bore of said cylinder, said groove being of progressively increasing cross section in a direction axially of said cylinder.

14. In combination, a vehicle structure, a seat mounted on the vehicle structure, a clamping device secured to said vehicle structure, a seat belt having one end connected to the seat and having its opposite end arranged for securing a passenger in the seat, said belt extending from said seat at said one end through said clamping device and from said clamping device in a direction forwardly and upwardly of the seat, said clamping device including a housing secured to the vehicle structure and a clamp rotatably mounted in said housing, said housing having a belt clamping portion and said clamp having a belt clamping portion, said belt extending between said clamping portions, said clamp having a second portion spaced from the pivotal axis of the clamp and around which said belt extends, the arrangement being such that tension on the belt pivots said clamp to cause said clamping portions to firmly engage said belt.

15. The combination called for in claim 14 wherein said second portion of said clamp comprises a roller.

16. The combination called for in claim 14 including a spring connected at one end to said clamp and at its opposite end to said housing and tending to pivot said clamp in a direction such that said clamping portions are separated.

17. The combination called for in claim 14 including a mounting means securing said housing to said vehicle structure, said mounting means being yieldably movable in a forward direction in response to sudden deceleration of the vehicle.

18. The combination called for in claim 17 wherein said mounting means comprises a mounting plate provided with deformable portions adapted to yield under excessive tension in said belt.

19. In combination, a vehicle structure, a seat mounted on the vehicle structure, a pair of clamping devices secured to the vehicle structure and spaced apart transversely of the vehicle, a seat belt comprising two portions, one end of each belt portion being connected to the seat and the free ends of said belt portions being adapted to be connected together to secure a passenger in the seat, each of said belt portions extending from said seat at said one end thereof through said clamping devices and from said clamping devices in a direction forwardly and upwardly of the seat to the free end portions thereof, said clamping device comprising a pair of clamping members, one of which is secured to the vehicle structure and the other of which is movably mounted on the first mentioned clamping member, said clamping members having clamping surfaces between which said belt portions extend, each of said belt portions engaging its respective movable clamping member and urging said member in a direction such that said belt is securely engaged between said clamping portions in response to tensioning of said belt portions.

20. In combination, a vehicle structure, a seat mounted on the vehicle structure, a pair of clamping devices secured to the vehicle structure and spaced apart transversely of the vehicle, a seat belt comprising two portions, one end of each belt portion being connected to the seat and the free ends of said belt portions being adapted to be connected together to secure a passenger in the seat, each of said belt portions extending from said seat at said one end thereof through said clamping devices and from said clamping devices in a direction forwardly and upwardly of the seat to the free end portions thereof, said clamping device comprising a pair of clamping members, one of which is secured to the vehicle structure and the other of which is movably mounted on the first mentioned clamping member, said clamping members having clamping surfaces between which said belt portions extend, each of said belt portions engaging its respective movable clamping member and urging said member in a direction such that said belt is securely engaged between said clamping portions in response to tensioning of said belt portions, and resilient means biasing said movable clamp member in a direction tending to separate said clamping portions, said seat being movable forwardly and rearwardly on said vehicle structure.

21. In combination, a vehicle structure, a seat mounted on the vehicle structure, a clamping device secured to said vehicle structure, a seat belt having one end connected to the seat and having its opposite end arranged for securing a passenger in the seat, said belt extending from said seat at said one end through said clamping device and from said clamping device in a direction forwardly and upwardly of the seat, said clamping device including a housing secured to the vehicle structure and a clamp member movably mounted in said housing, said housing having a belt clamping portion and said clamp member having a belt clamping portion, said belt extending between said clamping portions, said clamp member having a second portion spaced from the belt clamping portion and around which said belt extends, the arrangement being such that tension on the belt moves the clamp member to cause said clamping portions to firmly engage the belt.

22. In combination, a vehicle structure, a seat having a portion movably mounted on the vehicle structure, a clamping device secured to the vehicle structure adjacent the seat, a seat belt having one end connected to the movable portion of the seat, said belt extending from said movable seat portion at said one end through said clamping device and from said clamping device in a direction forwardly and upwardly of the seat, the other end of said belt being arranged for securing a passenger in the seat, said clamping device including a pair of clamping portions, at least one of which is movable toward and away from the other, said belt normally extending freely through said clamping device between said clamping portions, said movable clamping portion being responsive to tensioning of the belt to move towards the other clamping portion and thereby exert a firm clamping pressure on the portion of the belt extending therebetween and thus anchor both the movable portion of the seat and the passenger on the seat to the vehicle structure.

23. The combination called for in claim 22 including means normally biasing said movable clamping portion in a direction away from the other clamping portion, said belt, when in slack condition, being freely movable through said clamping device in response to movement of the movable portion of the seat to which one end of the belt is connected.

References Cited in the file of this patent

UNITED STATES PATENTS

| | | |
|---|---|---|
| 2,365,626 | Carlisle | Dec. 19, 1944 |
| 2,771,128 | Doolittle | Nov. 20, 1956 |
| 2,777,502 | Travis | Jan. 15, 1957 |
| 2,823,045 | Dye | Feb. 11, 1958 |